UNITED STATES PATENT OFFICE.

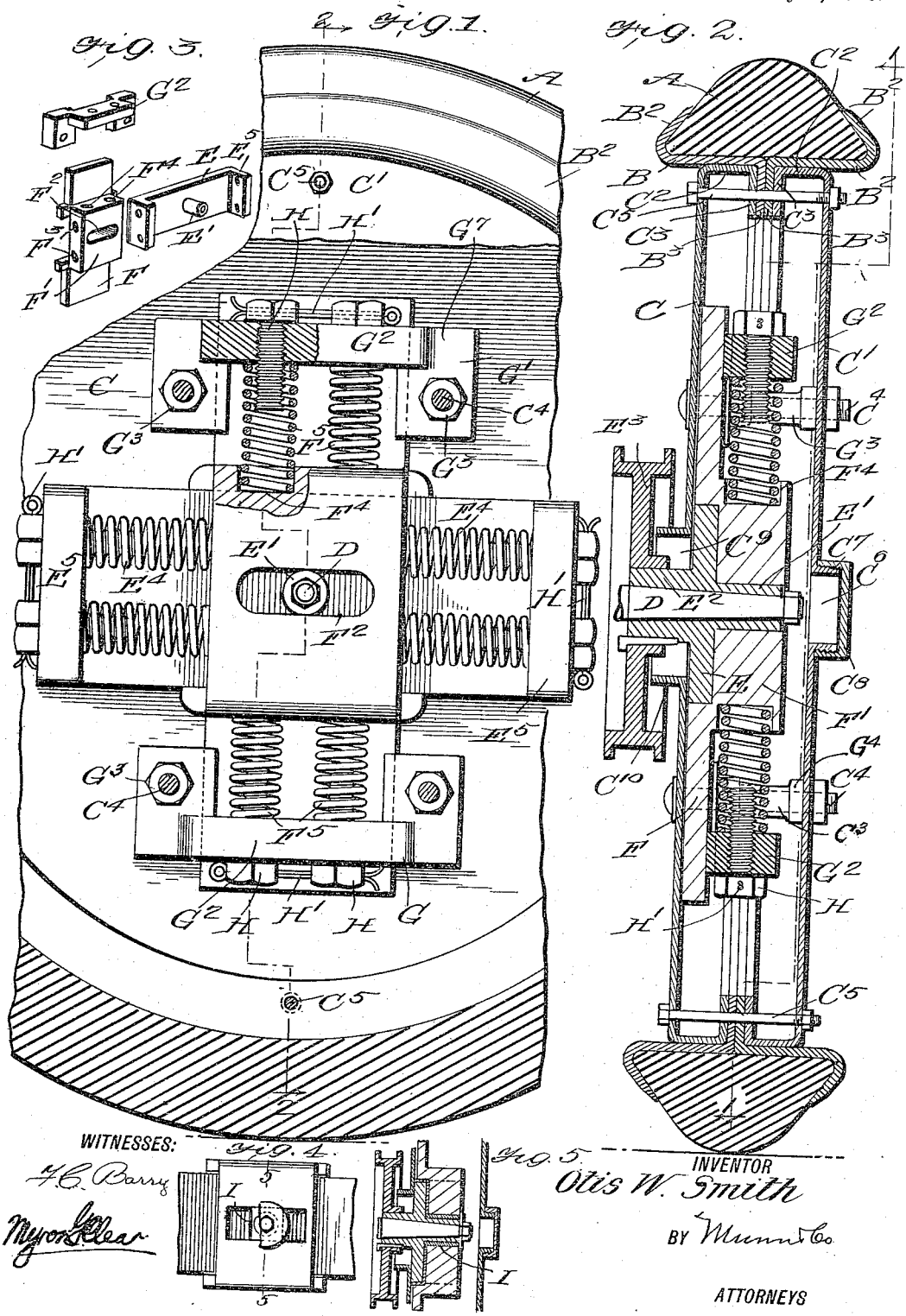

OTIS WAYLAND SMITH, OF CARROLLTON, KENTUCKY.

SPRING-WHEEL.

1,182,673. Specification of Letters Patent. Patented May 9, 1916.

Application filed October 14, 1915. Serial No. 55,749.

*To all whom it may concern:*

Be it known that I, OTIS W. SMITH, a citizen of the United States, and a resident of Carrollton, in the county of Carroll and State of Kentucky, have invented a certain new and useful Improvement in Spring-Wheels, of which the following is a specification.

My present invention relates particularly to spring wheels, my primary object being to provide a novel construction which will be highly effective in, and strong and durable for the purposes for which devices of this character are intended.

A further and more specific object of my invention is to provide a novel construction of spring wheel by which all lateral strains as well as the torque of movement may be taken up without danger of displacing the parts or creating undue friction in the operation thereof.

These and other objects, together with the advantages resulting therefrom, will be clearly apparent from the following description, reference being made to the accompanying drawing forming a part of this specification, and in which—

Figure 1 is a fragmentary vertical section taken substantially on line 1—1 of Fig. 2, the operating parts being exposed in side view and partly broken away and in section. Fig. 2 is a transverse vertical section taken therethrough substantially on line 2—2 of Fig. 1. Fig. 3 is a detail perspective view illustrating the two slide plates and one of the bearing brackets for one of these plates, in detached relation, Fig. 4 is a side view of the intermediate portions of the slide plates, illustrating the use of a bushing around one of the bearing portions of one of the slide plates, and Fig. 5 is a detail vertical section taken substantially on line 5—5 of Fig. 4.

Referring now to these figures, the tire carrying rim of my improved wheel, which supports the tire A, is composed of sections B and B', each having an outer flange $B^2$ engaging the tire and each having an inner inwardly projecting annular flange $B^3$, these latter flanges being, as particularly seen in Fig. 2, in face to face relation around the inner periphery of the rim in substantially the median line of the wheel itself. These flanges $B^3$ may be connected together by bolts or machine screws if it is so desired, and in this event such fastening members as are used should be countersunk in order to provide for close contact relation between the outer faces of the inner flanges $B^3$ and the inner faces of inturned annular flanges $C^3$ at the inner portion of inturned angular flanges $C^2$ bearing upon the inner periphery of the rim and formed at the outer edges of the side plates C and C' constituting the body of the wheel and spaced apart so as to house between them the spring operating parts by which the desired resiliency between the rim and the axle of the wheel is attained.

The side plates C and C' are connected by intermediate bolts $C^4$ and outer bolts $C^5$, the latter of which pass through the meeting and abutting flanges $B^3$ and $C^3$ as clearly shown in Fig. 2, and as seen in this figure the side plate C' is provided with an axial opening $C^6$ surrounded by a threaded flange $C^7$ upon which a cap $C^8$ is normally secured, removal of this cap permitting access to the space between the plates C and C' for the introduction of lubricant to the working parts. Thus, with the particular construction around the outer edges of the side plates C and C', lubricant within the space between these plates, which is thrown outwardly by the centrifugal force in operation of the wheel, will be retained and returned to the working parts when the wheel is at rest. The opposite side plate C also has an axial opening $C^9$, surrounded by a flange $C^{10}$ and of somewhat greater proportions than the axial opening $C^6$ of the other plate C'.

The axle spindle indicated at D has a bearing in the inwardly and outwardly projecting bearing portions E' and $E^2$ of a plate E, the said bearing portion $E^2$ of which extends through the opening $C^9$ of plate C and may receive a brake member indicated at $E^3$.

The plate E slides upon the inner surface of the side plates C in the space between said side plate C and the intermediate offset portion F' of a plate F extending across and at right angles to plate E, having its ends projecting through bearing brackets G, and having its said intermediate portion F' provided with a slotted opening $F^2$ elongated in the direction of the length of plate E as particularly seen in Fig. 1.

The inwardly projecting portion or bearing E' of plate E, extending through slot $F^2$ just mentioned, thus permits of movement of plate E, supported as it is against the side wheel plate C by means of plate F, lies in a plane transverse to the axial plane of the wheel independent of plate F, which movement is controlled by means of springs $E^4$ in the form of compression coil springs arranged in pairs at opposite sides of the plate F, with their inner ends seated in sockets $F^3$ in said plate sides, and their outer ends abutting angular flanges $E^5$ at the opposite ends of the plate E.

The plate E being unconnected to the wheel side plate C, is movable with the plate F in the movement of the latter in the direction of its length at right angles to the direction of independent movement of plate E through the brackets G, each of which includes side portions $G'$ and an offset connecting arch $G^2$, the inner side edges $G^3$ of the side portion $G'$ lapping the side edges of plate F to add to the already broad bearing surfaces between the parts.

The movement of plate F in the direction of its length is controlled, like the individual or independent movement of plate E, through the medium of compression coil springs arranged in pairs upon opposite ends thereof, with their inner ends seated in sockets $F^4$ in the shoulders formed by the centrally offset portion $F'$ of the plate and with their outer ends bearing against the intermediate arch portions $G^2$ of the bearing brackets G.

The brackets G are rigidly secured to the side wheel plates C through the medium of intermediate thimbles $G^3$ surrounding the intermediate connecting bolts $C^4$ before mentioned, and disposed between the side portions $G'$ of the brackets G, through which bolts $G^4$ pass, and the side plates $C'$ as will be clearly seen by reference to Fig. 2. These thimbles may be either loosely disposed upon the bolts or may be threaded thereon, and to this end provided with hexagonal heads $G^4$ whereby their proper placement may be readily effected.

The intermediate arches $G^2$ of the bearing brackets G and the angular ends $E^5$ of plate E, are provided further with threaded openings for the reception of screw plugs H, the inner ends of which extend within the outer ends of the springs $E^4$ and $F^5$ to prevent displacement of these springs, and at the same time permit of their withdrawal for purpose of repair and substitution, by first withdrawing the screw plugs H, the outer headed ends of which are preferably apertured for the reception of cotter pins $H'$ extending through the heads of the plugs of each pair to prevent accidental displacement or loosening thereof.

If it is so desired a bushing I such as seen in Figs. 4 and 5, may be interposed between contacting portions of the plates E and F, in order to bear the burden of wear through friction of these parts in their relative movement, and other slight practical changes of this nature may be made, illustration of which is unnecessary as neither adding to nor detracting from the real invention as shown and described.

In the operation of the device, when pressure is applied to the axle and its spindle D, independent movement of plate E in the direction of its length, and movement of this plate in a plane transverse to the direction of its length with the plate F, the latter of which is movable in the direction of its length, permits of movement of the spindle in all directions, and at the same time enables all lateral strains to be well taken care of through the mounting of these plates, undue friction being avoided by the relatively broad bearing surfaces between the same, and the adjacent parts contributing to their support. In all such movements it is to be understood, of course, that tension is supplied by the springs $E^4$ and $F^5$ mounted as before described, and readily removable as shown, by the removal of screw plugs H, for purposes of substitution and repair, in furtherance of which the side plate $C'$ is readily removable by removing the nuts of bolts $C^4$ and $C^5$. It is also to be seen that in view of the close proximity of flange $C^{10}$ surrounding the axle receiving opening $C^9$ of the body plate C, to the brake wheels $E^3$, and in particular of the fact that the slide plate E in its movement upon the inner face of body plate C, covers opening $C^9$ it is practically impossible for dust, dirt, or other extraneous matter to find its way into the space between the body plates C and $C'$ and thus to the working parts housed thereby.

I claim:—

1. In a spring wheel, the combination of a body plate having a central axle receiving opening, a pair of slide plates disposed upon said body plate at right angles to one another, and one of which plates is slidable in the direction of its length and is provided with a central offset portion, bearings secured to the body plate and through which said latter slide plate extends, whereby to prevent lateral movement thereof, the other slide plate extending within the offset portion of the first plate and being movable in a lateral direction with said first plate and also movable independently of the first plate in the direction of its length, and springs radiating from and bearing on said offset portion of the first plate, certain of which springs engage the second plate.

2. A wheel including spaced body plates each formed in one piece and having an outer angular flange provided with an inwardly extending annular portion at the inner end of said flange, a rim having annular flanges around its inner median line to which said annular portions of said plates are secured whereby to close the space between said body plates adjacent to the rim, said body plates having central openings, one of which constitutes an axle receiving aperture, and the other of which provides for the introduction of lubricant, axle supporting parts within the space between the said body plates, and a cap for normally closing said lubricant opening.

3. In a spring wheel, the combination of a body plate having a central axle receiving opening, a pair of spaced brackets secured upon the inner face of said body plate, a plate having its ends slidably disposed in the said brackets, said plate being movable upon the inner face of the body plate in the direction of its length and at right angles to the axis of the body plate and having an intermediate offset portion, a second plate disposed upon the inner face of the body plate at right angles to the first plate, and extending beneath the offset intermediate portion thereof, said last named plate being movable with the first named plate upon the body plate and also having movement in the direction of its length independent of the first named plate and provided with angular ends, and compression springs disposed between the offset portion of the first plate and the angular ends of the second plate, and other springs disposed between the offset portion of the first named plate and the said bearing brackets.

4. In a spring wheel, the combination of a body plate having a central axle receiving opening, a pair of spaced brackets secured upon the inner face of said body plate, a plate having its ends slidably disposed in the said brackets, said plate being movable upon the inner face of the body plate in the direction of its length and at right angles to the axis of the body plate and having an intermediate offset portion, a second plate disposed upon the inner face of the body plate at right angles to the first plate, and extending beneath the offset intermediate portion thereof, said last named plate being movable with the first named plate upon the body plate and also having movement in the direction of its length independent of the first named plate, and provided with angular ends, and compression springs disposed between the offset portion of the first plate and the angular ends of the second plate, and other springs disposed between the offset portion of the first plate and the said bearing brackets, the said offset portion of the first slide plate being provided with sockets in which the inner ends of the said springs are seated, and screw plugs threaded through the said angular ends of the second plate and through the said bearing brackets, and projecting into the outer portions of the said springs to prevent accidental displacement thereof.

5. In a spring wheel, the combination of a body plate having a central axle receiving opening, a pair of spaced brackets secured upon the inner face of said body plate, a plate having its ends slidably disposed in the said brackets, said plate being movable upon the inner face of the body plate in the direction of its length and at right angles to the axis of the body plate and having an intermediate offset portion, a second plate disposed upon the inner face of the body plate at right angles to the first plate and extending beneath the offset intermediate portion thereof, said last named plate being movable with the first named plate upon the body plate and also having movement in the direction of its length independent of the first named plate and provided with angular ends, compression springs disposed between the offset portion of the first plate and the angular ends of the second plate, and other springs disposed upon the offset portion of the first named plate and the said bearing brackets, the said intermediate offset portion of the first slide plate having a slotted opening elongated in the direction of the length of the second plate, and said second plate having axle receiving bearings, one of which projects through the said slotted opening.

6. In a spring wheel, the combination of a pair of spaced body plates, one of which has a central axle receiving opening, a pair of spring controlled slide plates disposed upon the inner surface of said apertured body plate, at right angles to and crossing one another, one of said plates having an intermediate offset portion forming a bearing between the same and the adjacent body plate for the reception of the other slide plate, said first named slide plate having movement in the direction of its length and said second plate having movement with the first plate and having movement in the direction of its length independent of the first plate, brackets secured to the adjacent body plates and in which the first slide plate is adjustable, bolts connecting the said body plates and extending through the said brackets, and thimbles disposed upon the said bolts between the said brackets and the body plate remote therefrom.

OTIS WAYLAND SMITH.

Copies of this patent may be obtained for five cents each, by addressing the "Commissioner of Patents, Washington, D. C."